United States Patent [19]
Knutson

[11] Patent Number: 5,295,742
[45] Date of Patent: Mar. 22, 1994

[54] COMPARTMENTED CONTAINER FOR CRAFT TOOLS AND MATERIAL

[76] Inventor: Carol A. Knutson, 12717 Pleasant Valley Rd., Woodstock, Ill. 60098

[21] Appl. No.: 853,443

[22] Filed: Mar. 18, 1992

[51] Int. Cl.⁵ .................. A47B 95/02; E05C 7/06
[52] U.S. Cl. .................. 312/244; 312/222; 108/43
[58] Field of Search .......... 312/244, 902, 348.2, 312/217, 222; 108/43; 248/444

[56] References Cited

U.S. PATENT DOCUMENTS

| | | | |
|---|---|---|---|
| 213,814 | 4/1879 | Emanuel | 312/348.3 X |
| 2,541,890 | 2/1951 | Schaperkotter et al. | 312/902 X |
| 3,967,869 | 7/1976 | Jackson | 312/902 X |
| 4,071,286 | 1/1978 | Moyer | 312/348.3 |
| 4,073,554 | 2/1978 | Oder et al. | 312/199 |
| 4,643,280 | 2/1987 | Hensley | 312/244 X |
| 4,700,634 | 10/1987 | Mills et al. | |
| 4,765,583 | 8/1988 | Tenner | 108/43 X |
| 4,895,418 | 1/1990 | Medellin et al. | 312/297 X |
| 5,078,460 | 1/1992 | Holsinger | 312/244 |
| 5,081,936 | 1/1992 | Drieling | 108/43 |

Primary Examiner—Kenneth J. Dorner
Assistant Examiner—Nancy Mulcare
Attorney, Agent, or Firm—Mathew R. P. Perrone, Jr.

[57] ABSTRACT

A container with a padded base and a hinged flat top shelf contains a compartment former therein. The compartment former has divider system for providing adjustable compartments suitable for holding a variety of handicraft materials.

14 Claims, 5 Drawing Sheets

COMPARTMENTED CONTAINER FOR CRAFT TOOLS AND MATERIAL

This invention relates to a combined-function container, and more particularly to a combined-function container with a work surface and adjustable compartments suitable for storing and assisting in the transportation of handicraft material or tools.

BACKGROUND OF THE INVENTION

Sewing, cross stitching and similar handicraft skills are very popular hobbies. A hobby of this type can even be made profitable, to the point of becoming a business. However, such hobbies or businesses require a relatively permanent location to carry out the operation. The handicraft materials and tools for working with the materials can be bulky, difficult to transport, and hard to organize; except when there is a fixed location in order to do the necessary work.

It is extremely difficult to transport materials suitable for carrying out these hobbies or businesses away from a fixed location. There are a number of items, both large and small, that need to be carried and transported. Also needed in many cases is a shelf on which to work. It is very difficult to provide for a shelf in combination with storage capabilities for transporting materials.

Many tools and components can be required to do handicraft work. The varying sizes of each tool or component complicate the storage feature. Each item requires a different sized storage compartment. If the project or handicraft changes, the compartment setup of the storage container may not be suitable for the new components or tools. It is highly desirable to provide for at least one compartment to be changeable in size or subdivided within the container.

To combine the requirements of storage, work space and portability is a major problem. The solution to one problem mitigates against a solution to the other problem. A container large enough to carry the required material may not be easily portable. A workspace may not have a variety of operable positions suitable for the various situations, in which a portable device may find itself in use by a person doing crafts. If a container is easily portable, it may not be of sufficient size to carry the required items.

Convenience of carrying or using a loaded container is also a critical matter. The loaded container must stand upright or lie on a side as desired. This flexibility is also difficult to obtain.

The problem thus becomes maximizing the advantage of each facet of combination container and work shelf, while at the same time, minimizing the negative implications of these contraindicative requirements. If each facet can be maximized while minimizing the disadvantages, substantial advantages can be obtained.

SUMMARY OF THE INVENTION

Accordingly, among the many objectives of this invention, is to provide a suitable container permitting efficient storage of handicraft material and tools, and providing an appropriate workspace while retaining portability of the container.

A further objective of this invention is to provide a container adjustable to a plurality of handicrafts.

A still further objective of this invention is to provide a container adjustable for sewing.

Yet a further objective of this invention is to provide a container adjustable for cross stitching.

Also an objective of this invention is to provide a container for bulky materials.

Another objective of this invention is to provide a container for a plurality of small items.

Still another objective of this invention is to provide a container for transporting handicraft material.

Yet another objective of this invention is to provide a container to maximize adaptabilty of a handicraft container.

A further objective of this invention is to provide a container which is both easily used and carried.

These and other objectives of this invention (which other objectives become clear by considering the specification, claims and drawings as a whole) are met by providing a container with a padded base and a hinged flat top shelf. Within the container is a compartment former or divider system for providing adjustable compartments suitable for holding a variety of handicraft materials.

BRIEF DESCRIPTION OF DRAWINGS

Throughout the figures of the drawing where the same part appears in more than one figure of the drawing, the same number is applied thereto.

DESCRIPTION OF THE PREFERRED EMBODIMENTS

A container having a padded base and a flat shelf top provides for the transporting of craft materials. This top is hinged and opens to reveal the hollow interior of the container. The padded base provides for a comfortable resting on the lap of a person doing the handicraft, while providing adjustable positioning of the flat top. The flat top provides for a place to work with the handicraft material in any suitable fashion.

The flat shelf top provides for a place to operate and carry out the required work on any handicraft material. Due to the padded and flexible base, the container may be comfortably held on a lap or any other desired work surface. With the flexibility of the padded base also serves to position the top shelf at a desired working position. Thus, the flat top shelf top may be positioned horizontally or at an angle to the horizontal due to the flexible padded base.

On the base of the container is preferably a pair of case legs adjacent to a hinge. The top shelf has a shelf ledge which extends in a fashion to cooperate with the case legs to permit the container to stand upright. The top shelf also optionally may include a shelf rim, which surrounds the edge of the top shelf. That rim extends above and frames a center portion of the top shelf to prevent an item from rolling off of the top shelf.

Within the container is a removable compartment former, which provides a variety of adjustable compartments suitable for storing the various materials needed. For example, a variety of threads can be stored for sewing along with the necessary needlework. A variety of yarn for cross stitching and other material can be stored. These adjustable compartments can be changed in dimension to suit the required material.

The removable compartment former may be inserted as desired into the container. The removable container includes a base with four walls therearound of a size sufficient to allow the container lid to close over the removable compartment former to secure materials within the various compartments while the container is being carried.

Within the four walls above-described are a plurality of slots. Each of the plurality of slots includes a first slot paired with a second slot to support a secondary wall. Each secondary wall cooperates with the slots in the four walls therearound to form compartments within the removable compartment former. Each secondary wall has a plurality of slots therein, which also cooperate with the slots in the four walls therearound or with slots in another secondary wall to form further, smaller compartments, as desired. In this fashion, the interior container may be adjusted for thread, needles, cloth, or other notions suitable for use in handicraft work.

Figure 1:
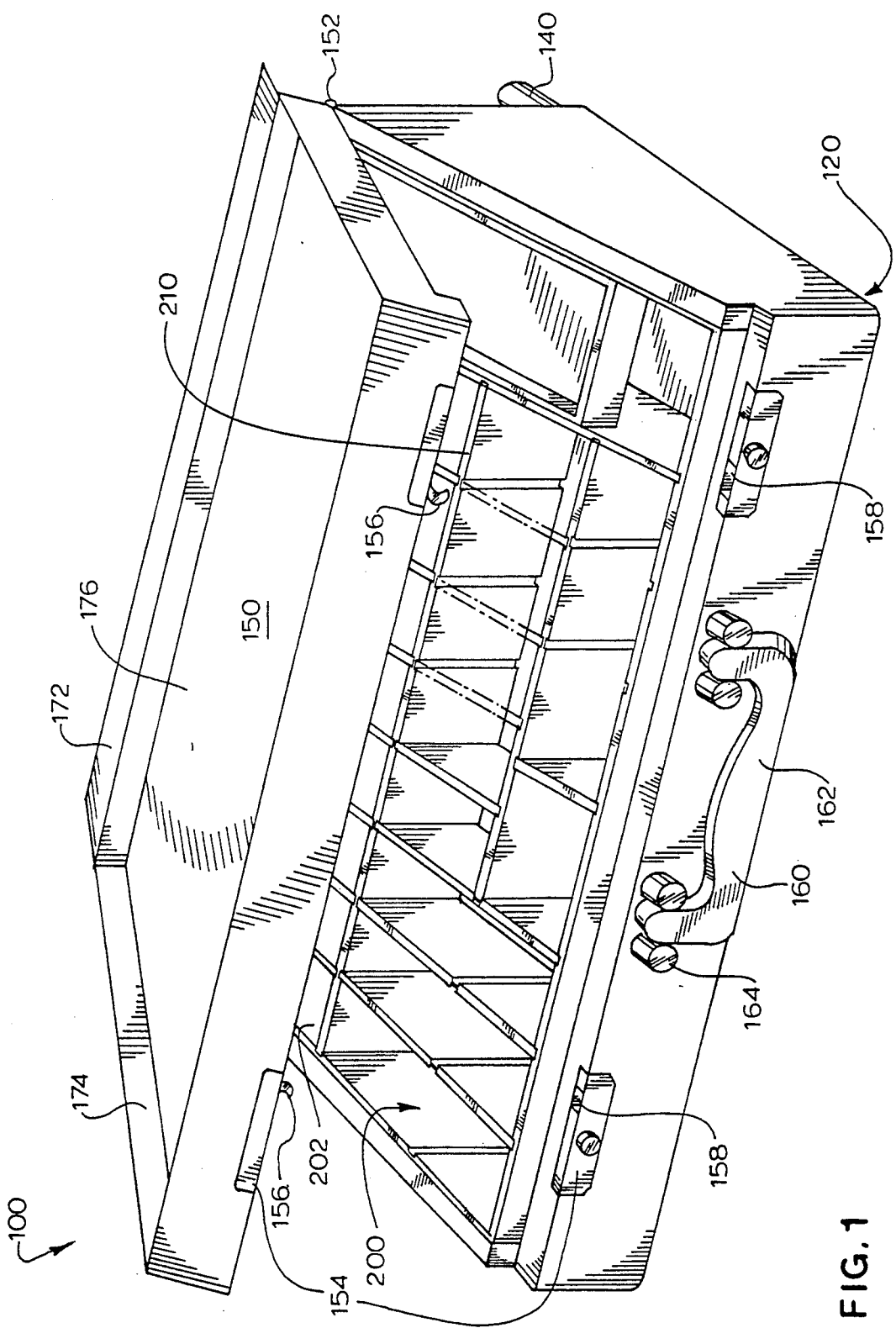
FIG. 1 depicts a top perspective view of container 100 with padded base 120 and flat shelf top 150 raised to expose compartment former 200.

Referring now to FIG. 1, container 100 having a padded base 120 and a flat shelf top 150 provides for the transporting of craft material. This top 150 is hinged and opens to reveal the removable compartment former 200. The padded base 120 is highly flexible. Such flexibility provides for both a comfortable resting of container 100 on the lap 102 of a person 104 doing the form of handicraft as desired, while at the same time, providing adjustable positioning of the flat top 150.

The flat shelf top 150 provides for a place to operate and carry out the desired operations on the handicraft material. Container 100 may be comfortably held on lap 102 or any other desired work surface due to padded base 120. Padded base 120 also serves to position shelf top 150. Flat shelf top 150 may be positioned flat or angled due to the flexibility of padded base 120. Particulate material for padded base 120 greatly increases the positionability of the container 100.

Within the container 100 may be placed the removable compartment former 200. The compartment former 200 provides a variety of adjustable compartments 202 suitable for storing the various materials needed for handicraft work. For example, a variety of threads can be stored for sewing along with the necessary needlework. A variety of yarn for cross stitching and other material can also be stored. These adjustable compartments 202 can be changed to suit the size of the material or tools to be carried, depending on the type of handicraft to be transported.

Lower solid frame 122 of container 100 has flat shelf top 150 secured thereto by hinge 152. Hinge 152 may be one or more hinges. One long hinge 152 is preferred for additional strength. On an edge of shelf top 150 and oppositely disposed from hinge 152 is part of fastener 154. Shelf top 150 includes the male member 156 of fastener 154, while lower solid frame 122 includes and has secured thereto in standard fashion a female member 158 of fastener 154.

Two of fastener 154 are shown with a foldable handle 160 secured therebetween. Handle 160 includes a gripping member 162 and handle supports 164 at each end thereof. Gripping member 162 rotates within handle supports 164 up to about 180° if desired.

The removable compartment former 200 may be inserted as desired. Within the removable compartment former 200 are several changeable compartments. The compartments may be adjusted to fit the suitable material to be stored therein. The removable compartment former 200 includes a base 204 with four walls 206 therearound of appropriate height so that the top 150 can close or seal the removable compartment former 200 to hold material in the various compartments while the compartment former 200 is in the container 100 being carried.

Figure 4:
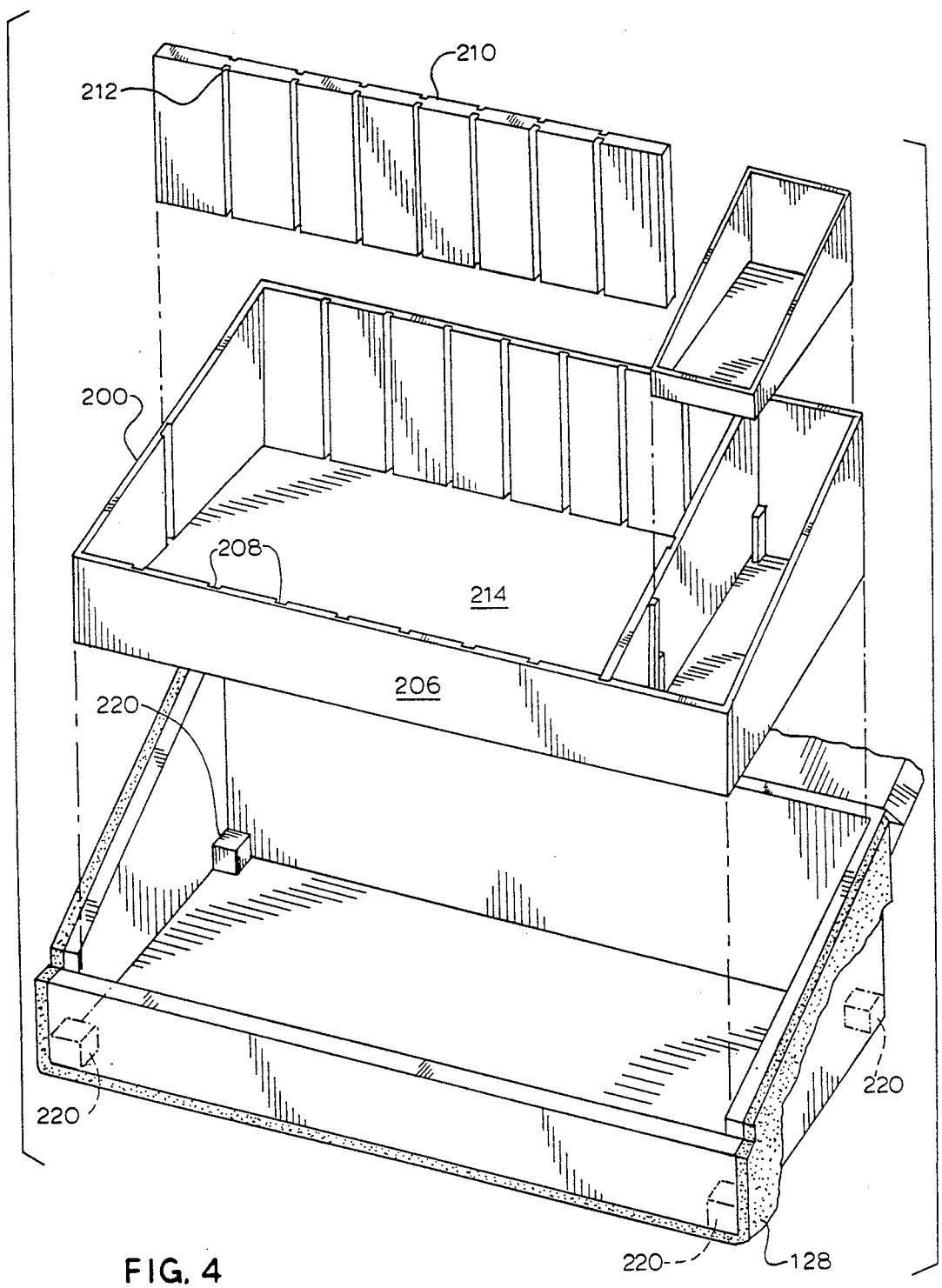
FIG. 4 depicts an exploded, rear perspective view of container 100 with removable compartment former 200, which appears as an optional, but preferred, reverse view of FIG. 1.

Within the four walls 206 around the interior edge of the removable compartment former 200 are a plurality of slots 208 (best shown in FIG. 4). Each slot 208 of the plurality of slots 208 is paired with a second slot 208 to support a secondary wall 210. The secondary wall 210 cooperates with the four walls 206 therearound to form compartments within the removable compartment former 200. Each secondary wall 210 may have a plurality of secondary slots 212 therein to cooperate with slots 208 in four walls 206 or with slots 208 another secondary wall 210 to a form at least one compartment 214.

A secondary compartment 222 may be removably inserted in compartment former 200. The secondary compartment 222 may be a container within secondary walls 210 and walls 206. Any removable compartment such as secondary compartment 222 or removable thread tray 306, may have magnets such magnet 342 or metal secured to the bottom thereof to permit holding on flat top shelf 150.

Figure 2:
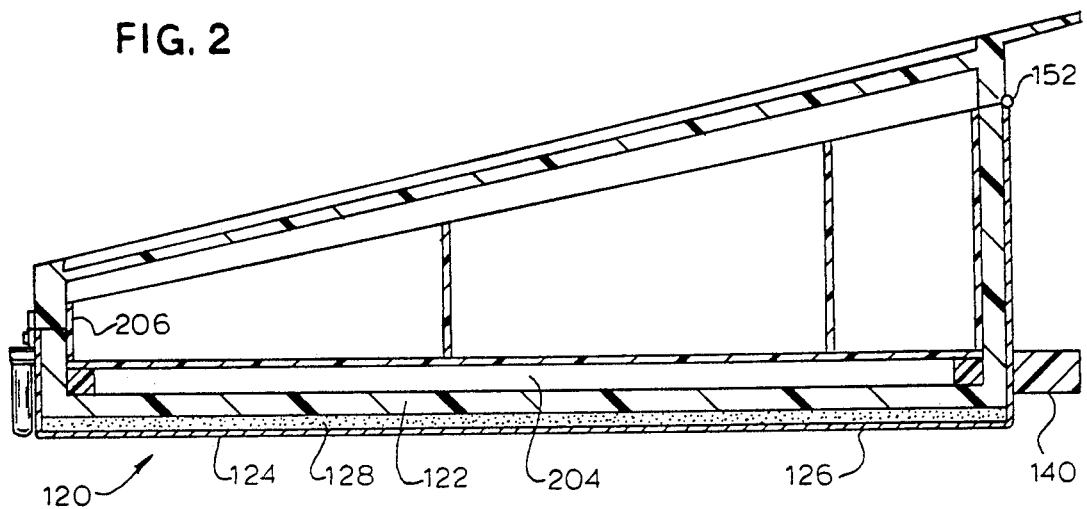
FIG. 2 depicts a side, cross-sectional view of container 100.
Figure 3:
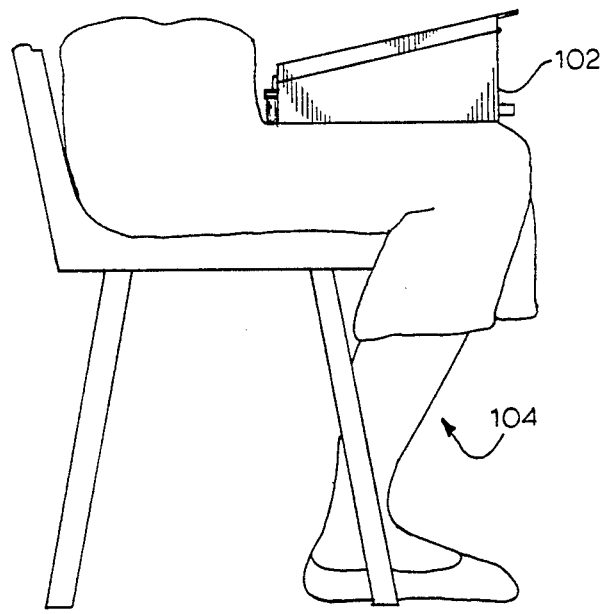
FIG. 3 depicts a side view of container 100 on a lap 102 of a person 104.

With reference to FIG. 2 and FIG. 3, the advantages of the padded base 120, become clear. The padded base 120 surrounds a lower solid frame 122 of container 100. Lower solid frame 122 may be of any suitable shape, but is preferably of hollow rectangular solid shape with an open top and sized to receive removable compartment former 200 snugly therein.

Container 100 preferably has a pair of case legs 140 adjacent hinge 152. Top shelf 150 has a shelf ledge 172 which extends in a fashion to cooperate with case legs 140 to permit container 100 to stand upright. Top shelf 150 also optionally may include a shelf rim 174, which surrounds the edge of top shelf 150. Rim 174 extends above a center portion 176 of top shelf 150 to prevent an item (not shown) rolling off of top shelf 150.

Removable compartment former 200 may also include compartment legs 220 on the base thereof. Compartment legs 220 create a space between compartment former 200 and the base of container 100. Such space may be used to store patterns or appliances or similar material.

Padded base 120 includes a foam material 124 on the exterior of lower solid frame 122 of container 100. Foam material 124 is then covered by a thin sheet 126. Thin sheet 126 may be fabric or other suitable material. The foam material 124 may be any padding material such as foamed material with a flexible foamed sheet being preferred. Foam particles 128 may replace foam sheet 124 partially or completely to provide for gripping of the lap 104 or appropriate angling of top shelf 150 with respect to the horizontal. In a preferred form, padded base 120 does not cover the sides of container 100 including hinge 152 or fastener 154.

By considering FIG. 4, it may be seen that the secondary walls 210 defining each compartment 214 may be adjusted to certain positions to achieve the desired compartment 214 size. In this fashion, the interior of container 100 may be adjusted for thread, needles, cloth, or other notions suitable for use in handicraft work.

Figure 5:
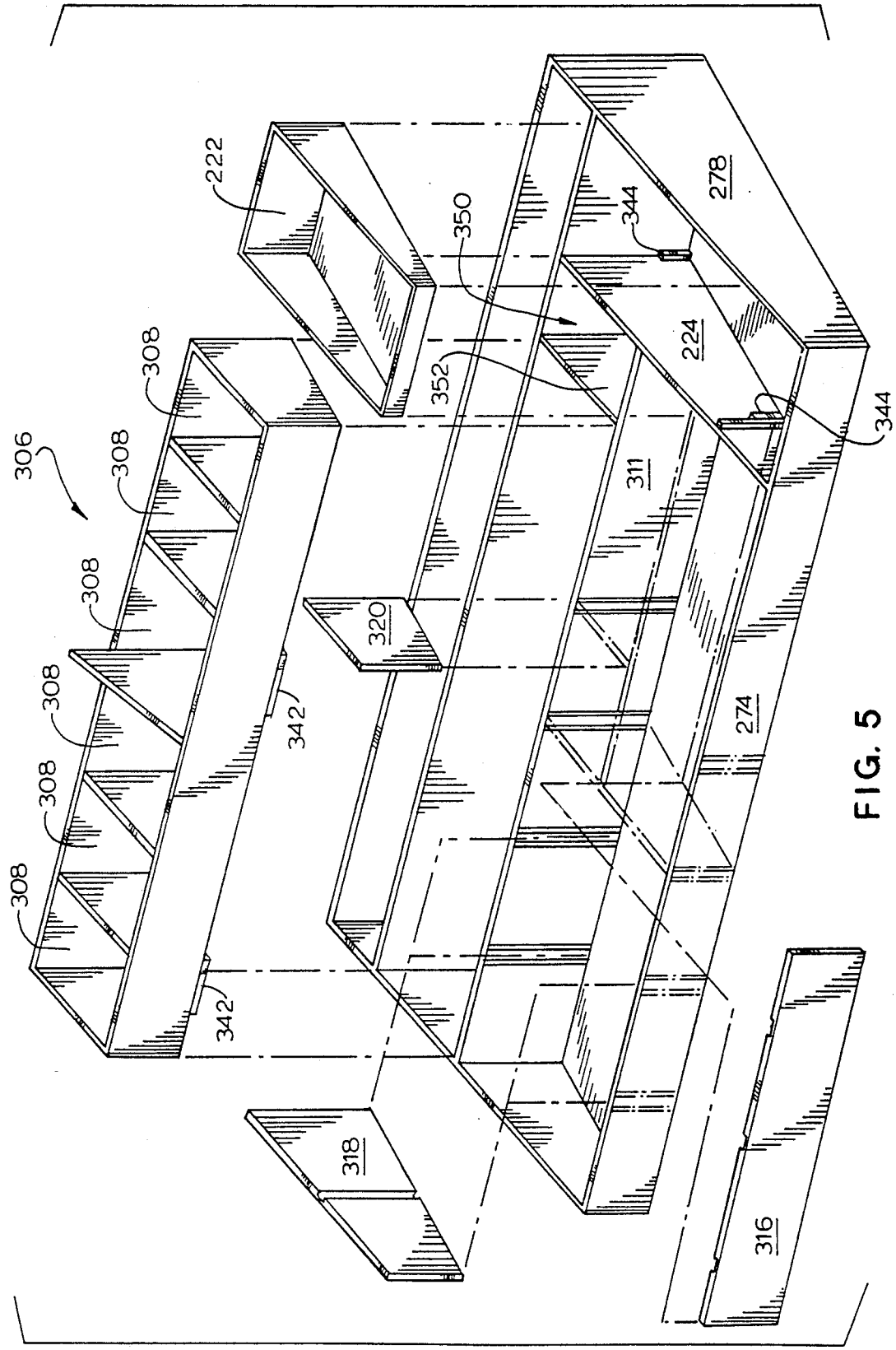
FIG. 5 depicts an exploded, front perspective view of cross-stitch insert 270.
Figure 6:
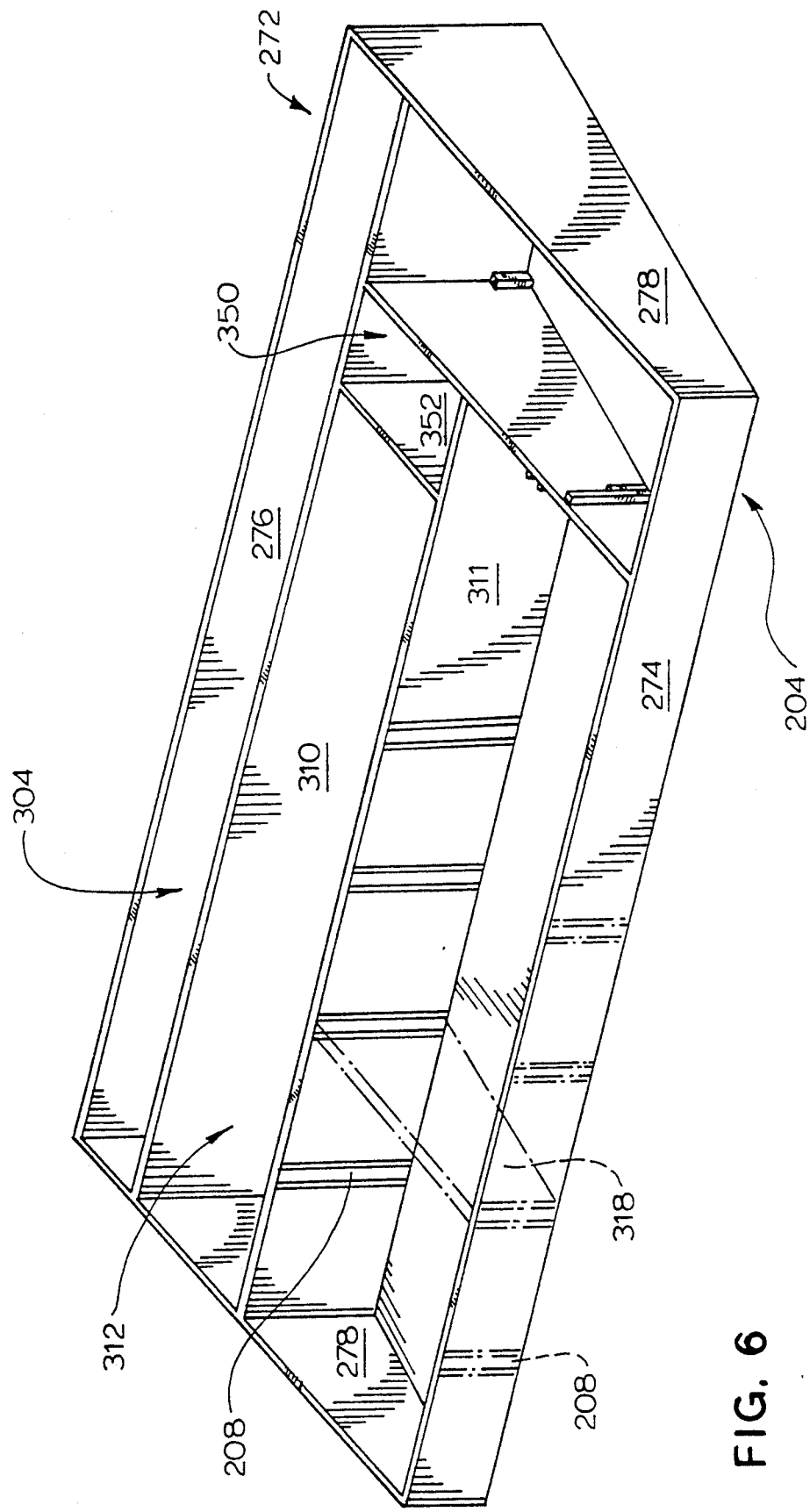
FIG. 6 depicts a front perspective view of cross-stitch base 272.

By combining FIG. 5 and FIG. 6, a preferred embodiment for a cross stitching version of the removable compartment former 200 may be shown. Compartment former 200 may be modified as shown to form cross-stitching insert 270 as a preferred embodiment thereof. The cross stitching insert 270 can fit into padded base 120 of container 100 and be closed by flat shelf top 150. Cross stitching insert 270 and subdivisions thereof or therein are generally of a hollow rectangular shape with an open top.

The cross stitching insert 270 includes a stitching support 272 similar to the base compartment former 200. Stitching support 272 includes a base 204 as does removable compartment former 200. Stitching support 272 includes a front wall 274 and a rear wall 276, both being substantially perpendicular to and at opposing edges of base 204. A pair of oppositely disposed sidewalls 278 are also perpendicular to base 204, each at an opposing edge thereof. Sidewalls 278 are also substantially perpendicular to front wall 274 and rear wall 276. This structure completes a substantially open topped hollow rectangular container receivable in a container 100 and closeable by flat top shelf 150.

Within stitching support 272 is rear long tray 304. Rear long tray 304 serves to hold fabric or tubes thereof (not shown) and extends completely along rear wall 276. Adjacent to rear long tray 304 is a removable thread tray 306 extending partially along rear long tray 304. This removable thread tray 306 has a series of compartments 308. Each compartment 308 is capable of holding spools of or other containers for thread suitable for cross-stitching. Thus, each thread stored therein is supported in a standard fashion for use thereof.

The rear long tray 304 is formed by a portion of side walls 278, fabric wall 310 and rear wall 276. Of course, fabric wall 310 may be made of any suitable rigid or semi rigid material, and fixedly or removably placed in stitching support 272 depending on the desired setup. Fabric wall 310 is between the front wall 274 and rear wall 276, and substantially parallel thereto. Fabric wall 310 combines with rear portions of side walls 278 and rear wall 276 and a portion of base 204 to form the rear long tray 304 as suitable for holding fabric and tubes thereof.

Between fabric wall 310 and front wall 274 and substantially parallel to front wall 274 is thread wall 311, which combines with portions of base 204, fabric wall 310 and front wall 274 to form thread compartment 312. Thread wall 311 completes thread compartment 312 is suitable for holding the removable thread tray 306. Compartments 308 are formed in removable thread tray 306 by thread compartment wall 314, which is fixedly or removably engaged within removable thread tray 306. While thread wall 311 is substantially parallel to fabric wall 310, it is not as long to permit insertion of removable compartment 222, alongside thread tray 306.

A secondary compartment wall 224 runs parallel to side walls 278 and forms a receiver therewith to hold removable compartment 222 in position. There is also provided a plurality of parallel slotted walls 316, long perpendicular inserted walls 318, and short perpendicular inserted walls 320. Parallel and perpendicular defines position relative to front wall 274. In this manner the cross stitching insert 270 or any other insert may be structured to achieve the desired adjustability and flexibility.

Removable thread tray 306 may be removed from cross-stitching insert 270 and placed on flat top shelf 150 for work. Thread tray 306 may be magnetically held in place. Shelf 150 may be magnetic itself or capable of cooperating with a magnet 342 secured to the base of thread tray 306. This magnetic aspect also applies to other removable trays.

Secondary compartment 222 may also be included in cross-stitching insert 270 adjacent to both removable thread tray 306 and rear long tray 304. Support for secondary compartment 222 is found in corner posts 344, which support the base of secondary compartment 222. Posts 344 space compartment 222 from base 204 and provide an additional storage space thereunder. The secondary compartment 222 is similar to that of the earlier figures.

The cross stitching insert 270 uses the stitching support 272 to hold and form the plurality of compartments. This structure forms basically a hollow rectangular structure with an open top closeable by flat top shelf 150. The front wall 274 and rear wall 276 are generally rectangular in shape with the front wall 274 having a narrower width than the rear wall 276 to provide a sloping of the container 270. Congruent sidewalls 278 are of a substantially, right angle trapezoid shape. Within front wall 274, side walls 278 and rear wall 276 are a plurality of slots and other supporting mechanisms.

Padded base 120 creates a certain flexibility in the container. With the padded base 120, the flat top shelf 150 may be positioned as desired and held there. The flexibility of the padded base 120 permits this to happen. This is especially effective when the padded base 120 includes a particulate padded member which can be adjusted, thereby providing a more flexible placement on a lap than a sheet padded member or foamed member. Accordingly, the desired results can be obtained with the flexibility. Especially important is that the thread container 306 have the magnets 342 therebelow so that the thread compartment may be placed on the top for easy access to thread and held in position as desired.

Adjacent to removable thread tray 306 and secondary compartment 222 is forward compartment 318. Forward compartment 318 is thus adjustable in size due to the provision of slot mechanisms similar to slots 208. Slots 208 are similar to those shown in FIG. 4.

Each slot 208 of the plurality of slots 208 is paired with a second slot 208 to support a secondary wall 318. The secondary wall 318 also has slots therein to cooperate with other slots in another secondary wall 318 or slots 208 in front wall 274, rear wall 276, or sidewalls 278.

The forward compartment 318 is adjustable in size due to the slot mechanisms. Accordingly, this particular preferred embodiment is very useful for cross stitching and similar handicrafts. The base of the cross stitch insert 270 is substantially similar to the other described inserts. However, the particular structure receives the two removable containers and supports the device as required.

A further fixed-in-dimension compartment 350 is defined by a portion of the other compartments, resting between wall 224 and wall 352 defining a side end of compartment 312. This fixed-in-dimension compartment 350 is suitable items of choice (not shown) such as scissors.

While there is no required material to make the device of this invention, it is preferred that container 100 be of magnetic material or material capable of holding a magnet. More particularly lower solid frame 122 and shelf top 150 secured are generally magnetic or capable of holding a magnet. The removable compartment former 200, the cross stitching insert 270 and parts thereof are usulaly thin semi-rigid plastic or synthetic sheets.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this container 100 can become clear to a person having ordinary skill in this particular art. Such modifications are clearly covered by this disclosure.

What is claimed and sought to be protected by Letters Patent of the United States is:

1. A container for transporting handicraft material, wherein:
   a. said container includes a padded base and a hinged flat top shelf movably secured thereto;
   b. said padded base includes a compartment former containable therein;
   c. said compartment former has a divider system for providing at least two compartments therein;
   d. said divider system includes a means for adjusting a size of said at least two compartments;
   e. said padded base includes a flexible padding means secured thereto provide comfort and permit said hinged flat top shelf to be a work support surface;
   f. said hinged flat top shelf provides a workspace for handicraft material;
   g. said compartment former is removably contained within said container;
   h. said removable compartment former is closable by said hinged flat top shelf;
   i. said removable compartment former includes a compartment base and four compartment walls therearound said four walls combining with said compartment base to form a hollow rectangle having an open side;
   j. said compartment walls cooperate with said hinged flat top shelf to render said removable compartment former closable;
   k. said means for adjusting includes a plurality of slots;
   l. said plurality of slots includes a first slot paired with a second slot to support a secondary wall;
   m. said secondary wall cooperates with said first slot and said second slot in the four walls therearound to form a compartment within said removable compartment former;
   n. said four walls include said plurality of slots;
   o. said secondary wall includes said plurality of slots therein;
   p. said plurality of slots in said secondary wall cooperate with said plurality of slots in said four walls to form a plurality of smaller compartments in said removable compartment former;
   q. at least one hinge connects said padded base to said hinged flat top shelf;
   r. said padded base is sufficient to assist with positioning of said hinged flat top shelf;
   s. at least one fastening assembly serves to close said container;
   t. said at least one fastening assembly includes a first fastening member secured to an edge of said hinged flat top shelf and oppositely disposed from said at least one hinge;
   u. said at least one fastening assembly includes a second fastening member is secured to said padded base and is oppositely disposed from said at least one hinge;
   v. said fastening assembly openably secures said padded base to said hinged flat top shelf;
   w. said at least one fastening assembly includes two of said at least one fastening assembly; and
   x. a handle means is mounted between said two of said at least one fastening assembly.

2. The container of claim 1, wherein said at least one hinge is a single long hinge.

3. The container of claim 1, wherein said handle means is a foldable handle.

4. The container of claim 1, wherein said removable compartment former includes a removable secondary compartment therein.

5. The container of claim 1, wherein said removable secondary compartment includes said plurality of slots.

6. The container of claim 1, wherein:
   a. said padded base includes a lower solid frame of hollow rectangular shape and sufficiently sized to receive said removable compartment former;
   b. said lower solid frame includes a pair of case legs oppositely disposed from said fastener assembly; and
   c. said top shelf includes a shelf ledge protruding therefrom, said shelf ledge being adjacent to both said hinge and to said case legs and said shelf ledge being of sufficient size and orientation to cooperate with said case legs to permit said container to stand upright.

7. The container of claim 6, wherein:
   a. said top shelf includes a shelf rim; and
   b. said shelf rim surrounds an edge of said top shelf to prevent an item rolling off of said top shelf.

8. The container of claim 7, wherein:
   a. said removable compartment former includes compartment legs on the base thereof;
   b. said compartment legs create a space between said compartment former and said container; and
   c. said space is suitable for storage.

9. The container of claim 8, wherein:
   a. said padded base includes a foam sheet on an exterior of said lower solid frame; and
   b. a thin sheet covers said foam sheet.

10. The container of claim 8, wherein:
   a. said padded base includes foam particles surrounding an exterior of said lower solid frame; and
   b. a thin sheet holds said foam particles surrounding said exterior of said lower solid frame.

11. A container for transporting handicraft material, wherein:
   a. said container includes a padded base and a hinged flat top shelf movably secured thereto;

b. said padded base includes a compartment former containable therein;
c. said compartment former has a divider system for providing at least two compartments therein;
d. said divider system includes a means for adjusting a size of said at least two compartments;
e. said padded base includes a flexible padding means secured thereto provide comfort and permit said hinged flat top shelf to be a work support surface;
f. said hinged flat top shelf provides a workspace for handicraft material;
g. said compartment former is removably contained within said container;
h. said removable compartment and padded base are closable by said hinged flat top shelf;
i. said removable compartment former includes a compartment base and four compartment walls therearound;
j. said means for adjusting includes a plurality of slots;
k. said plurality of slots includes a first slot paired with a second slot to support a secondary wall;
l. said secondary wall cooperates with said first slot and said second slot in the four walls therearound to form a compartment within said removable compartment former;
m. said removable compartment former includes four walls therearound;
n. said four walls include said plurality of slots;
o. said secondary wall includes said plurality of slots therein;
p. said plurality of slots in said secondary wall cooperate with said plurality of slots in said four walls to form a plurality of smaller compartments in said removable compartment former;
q. at least one hinge connects said padded base to said hinged flat top shelf; and
r. said padded base is sufficient to assist with positioning of said hinged flat top shelf;

12. The container of claim 11, wherein:
a. at least one fastening assembly serves to close said container;
b. said at least one fastening assembly includes a first fastening member secured to an edge of shelf top and oppositely disposed from said at least one hinge;
c. said at least one fastening assembly includes a second fastening member is secured to said padded base and is oppositely disposed from said at least one hinge;
d. said fastening assembly openably secures said padded base to said flat shelf top;
e. said at least one fastening assembly includes two of said at least one fastening assembly;
f. a handle means is mounted between said two of said at least one fastening assembly;
g. said handle means is a foldable handle;
h. said removable compartment former includes a removable secondary compartment therein;
i. said removable secondary compartment includes said plurality of slots;
j. said padded base includes a lower solid frame of hollow rectangular shape and sufficiently sized to receive said removable compartment former;
k. said lower solid frame includes a pair of case legs;
l. said top shelf includes a shelf ledge protruding therefrom, said shelf ledge being adjacent to both said hinge and to said case legs and said shelf ledge being of sufficient size and orientation to cooperate with said case legs to permit said container to stand upright;
m. said top shelf includes a shelf rim;
n. said shelf rim surrounds an edge of said top shelf to prevent an item rolling off of said hinged flat top shelf;
o. said removable compartment former includes compartment legs on the base thereof;
said compartment legs create a space between said compartment former and said container; and
q. said space is suitable for storage.

13. The container of claim 12, wherein:
a. said padded base includes a foam sheet on an exterior of said lower solid frame;
b. a thin sheet covers said foam sheet;
c. said handle means is a foldable handle.

14. The container of claim 12, wherein:
a. said padded base includes foam particles surrounding an exterior of said lower solid frame;
b. a thin sheet holds said foam particles surrounding said exterior of said lower solid frame.

* * * * *